May 18, 1954 — E. E. MASTERSON — 2,678,821

SYNCHRONOUS DRIVE APPARATUS

Filed April 29, 1948 — 2 Sheets-Sheet 1

INVENTOR
Earl E. Masterson
BY [signature]
ATTORNEY

May 18, 1954 E. E. MASTERSON 2,678,821

SYNCHRONOUS DRIVE APPARATUS

Filed April 29, 1948

2 Sheets-Sheet 2

INVENTOR
Earl E. Masterson
BY Morris A. Rabkin
ATTORNEY

Patented May 18, 1954

2,678,821

UNITED STATES PATENT OFFICE 2,678,821

SYNCHRONOUS DRIVE APPARATUS

Earl E. Masterson, Palmyra, N. J., assignor to Radio Corporation of America, a corporation of Delaware Application April 29, 1948, Serial No. 23,884

2 Claims. (Cl. 271—2.6)

Figure 1:
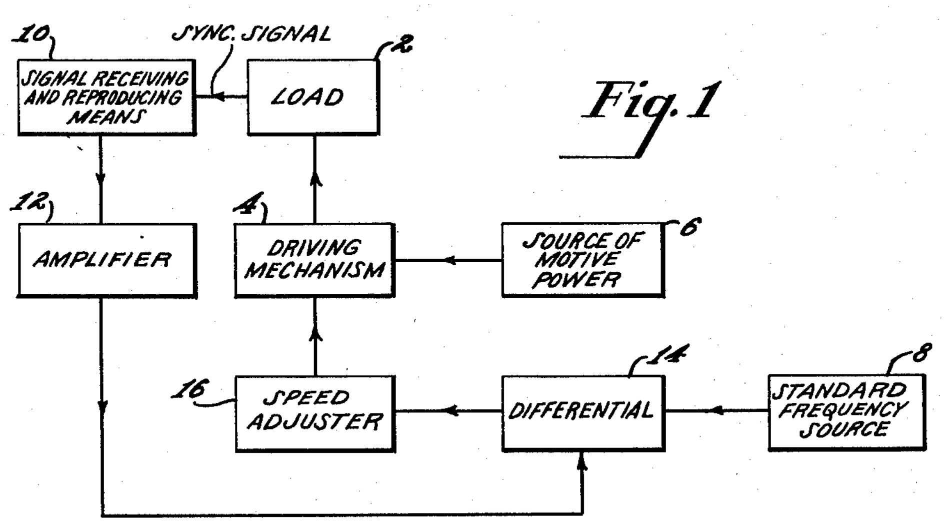

The present invention relates to constant-speed drive apparatus and, more particularly, to apparatus and methods which can be used to drive a recording tape in synchronism with a control source. The recording tape may be a photographic film or it may be a tape coated with magnetizable material. The control source may be another photographic film or tape or it may be a source of 60 cycle current. It is also possible that the apparatus be used to drive another type of recording medium such as a record turntable. In fact, it is intended that the invention be used generally for synchronizing the speed of any recording medium with a control source.

In recording systems using magnetic recording tape, it is usually desirable to have the tape as thin as possible and as small in width as possible in order to both conserve storage space and to reduce the bulk of the recording mechanism with which the tape is to be used. Because of the width limitation, and also because of the thinness of the tape, it is impractical to perforate it and use sprocket mechanisms such as commonly used in motion picture sound recording. It is, therefore, necessary to use some other type of mechanism for holding the tape in step with a control source.

In general, the type of apparatus in which synchronizing is normally difficult, if not impossible, is one in which the driving mechanism includes a belt, friction wheel, fluid drive, etc. These types of drives are desirable in recording and reproducing systems, not only because sprocket holes need not be used therewith but because of their low rumble and "wow" characteristic. Unfortunately, they do not lend themselves to synchronous driving like gear mechanisms do.

The present invention deals with improved systems for providing sychronous drives for those driving mechanisms of the type described which have previously presented synchronizing difficulties.

One object of the present invention is to provide improved apparatus and methods for driving a recording medium in synchronism with a control source.

Another object of the invention is to provide improved apparatus and methods for driving in synchronism with a control source a recording medium having indicia thereon.

Another object is to provide improved apparatus and methods for synchronously driving a recording medium which is subject to dimensional changes while in use.

Another object of the invention is to provide improved apparatus for synchronously driving a recording medium which cannot be provided with sprocket holes.

Another object of the invention is to provide improved apparatus, including friction drive means, for synchronously driving a recording or reproducing medium.

Another object of the invention is to provide improved apparatus, including friction drive means, for synchronously driving a recording or reproducing medium with a minimum of "wow" and rumble.

Another object of the invention is to provide an improved recording medium for use with synchronous drive apparatus.

Still another object of the invention is to provide apparatus for synchronously driving a recording or reproducing medium, which apparatus is characterized by simplicity of construction and operation.

Figure 2:
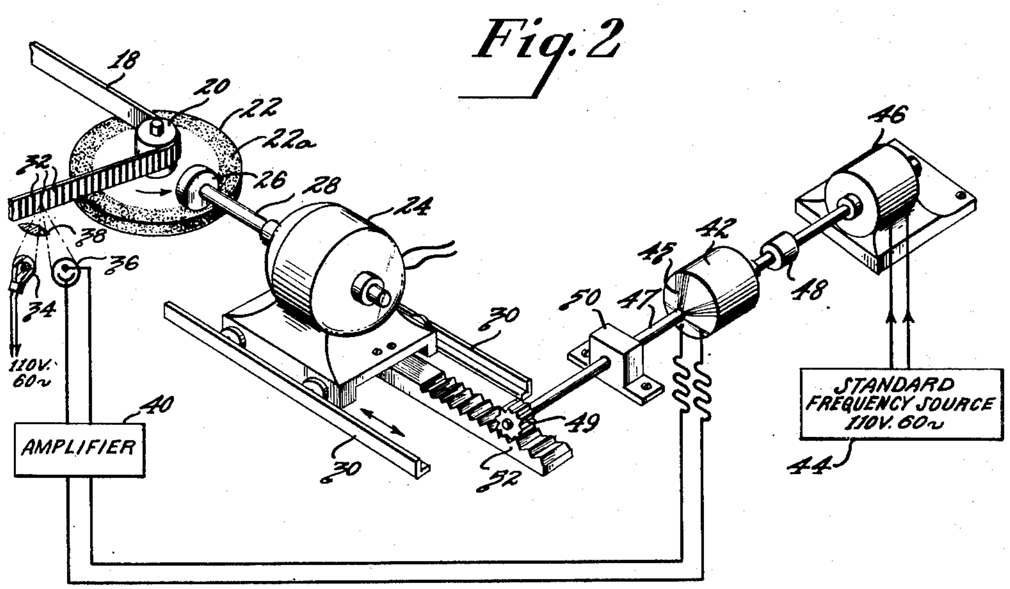
Figure 3:
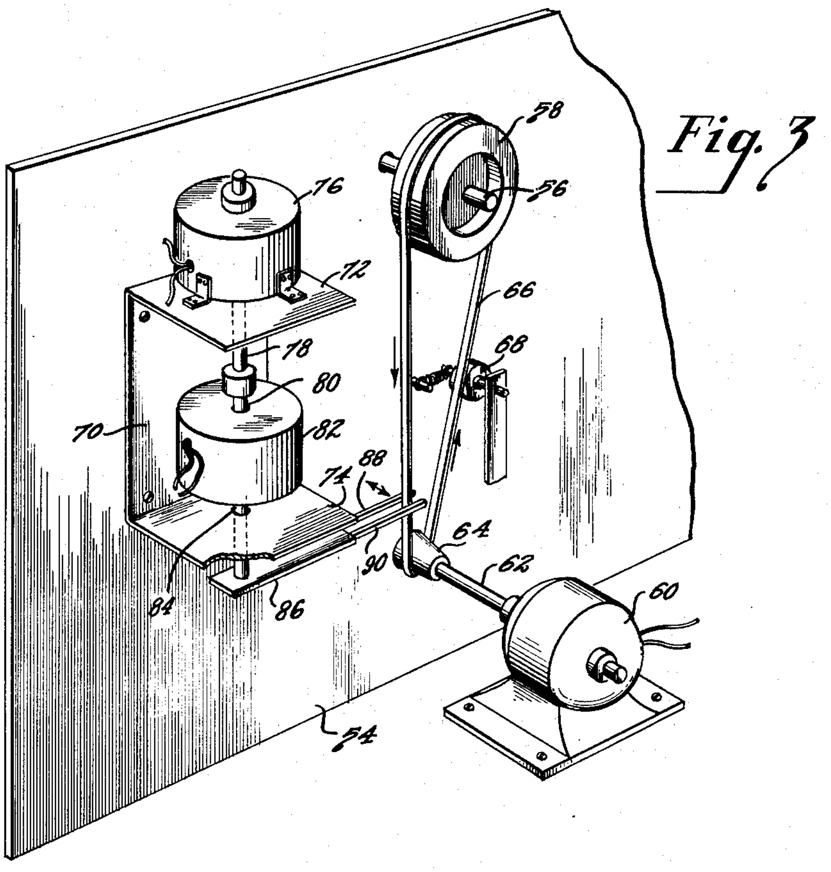
Figure 4:
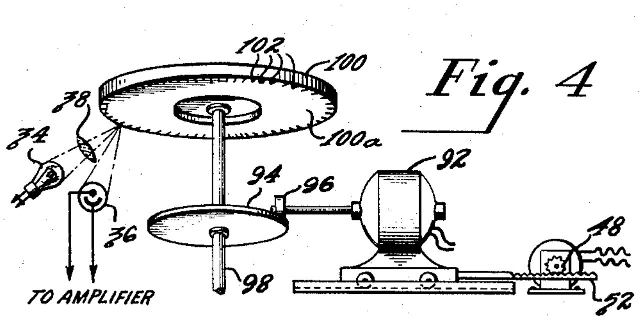
Figure 5:
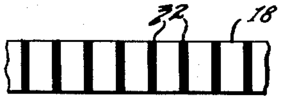

These and other objects will be more apparent and the invention will be better understood from the specification and the illustrative drawings, of which:

Fig. 1 is a block diagram of the general apparatus features included in the present invention, Fig. 2 is a diagrammatic perspective view of one embodiment of apparatus for carrying out the present invention, Fig. 3 is a perspective view of another embodiment of apparatus suitable for carrying out the present invention, Fig. 4 is a perspective view of still another embodiment of apparatus suitable for carrying out the present invention, and Fig. 5 is a detail view of one surface of an improved recording tape which may be used with the apparatus illustrated in Figs. 2, 3 or 4.

In general, the apparatus to be described in any of the several embodiments includes the elements shown in the block diagram of Fig. 1. A load device 2, such as a recording tape, is driven by a driving mechanism 4 mounted so that it is capable of applying various speeds to the load. This driving device is, in turn, driven by a source of motive power 6. In order to synchronize the frequency of a signal produced by the load device 2 with the frequency derived from a standard frequency source 8, the load device may be provided with indicia for sending a signal to a signal receiving and reproducing means 10. The signal output from the signal receiving and reproducing means may be amplified by an amplifier 12 and fed to a differential device 14 which is also supplied with the standard frequency from the standard frequency source 8. The differential device is caused to operate a speed adjusting means 10 which, acting through the source of motive power 6, varies the speed with which the variable speed driving mechanism 4 moves the recording medium, in accordance with the changes in the signal frequency received from the load device 2.

A more specific embodiment of a synchronizing means which may be used in the above described type system will now be described with particular reference to Fig. 2.

A recording tape 18 is driven by a driving pulley 20 connected by means of a shaft to a flywheel 22. The flywheel is provided with a friction surface 22*a* which may be of rubber. The flywheel is driven from a non-synchronous motor 24 supplied with power from the 110 v., 60 cycle mains, driving force being applied to the flywheel through a friction drive pulley 26 connected to the motor drive shaft 28. The friction drive pulley is adapted to slide back and forth radially on the friction surface 22*a* of the flywheel so that the speed of the flywheel may be varied even though the motor 24 runs at a substantially constant speed. The motor may be mounted on tracks 30 to permit sliding or rolling back and forth within the limits which may be required.

A recording tape or film may stretch or contract in use due to its being under a certain amount of tension and also because it is subject to normal ageing of its ingredients and to changing conditions of humidity and temperature. The tape may also slip or creep on the driving pulleys. Information may be recorded on the tape such that a certain average amount is put on every unit of length. But if parts of the tape stretch or contract thereafter, these sections will have the information spaced farther apart or crowded more closely together. If the tape is then run at a constant speed to reproduce the recorded information, the quality of reproduction will be poor since the speed of reproduction on the parts which have changed dimension will not be the same as the speed of recording. From this, it will be appreciated that a special problem exists of finding some means for varying the velocity of the tape, especially when it is reproducing the recorded information, such that the speed of reproduction of any one section will be the same as the speed of recording.

In the present invention, this problem is solved by a synchronization accomplished in the following manner. The tape may be provided with indicia by having printed on its back a continuous series of evenly spaced marks 32, such as illustrated in Fig. 5, these marks being of a color which contrasts with the background color of the tape. In a preferred embodiment, the tape, itself, has black surfaces. The rear surface of the tape is printed with a succession of bars made of a white pigmented ink. Any type of good adhering contrasting color ink may be used which does not interfere with the magnetic properties of the tape and which does not wrinkle the tape. The marks may be spaced such that when the tape is driven at normal recording or reproducing speed, 60 marks per second will pass a given point. A light source 34 may be provided to illuminate the tape which reflects light into a photocell 36, thus providing a scanning system which can detect any change in the frequency of passage of the indicia through the scanning beam. The light source is preferably focussed by a simple optical system 38 such that the scanning spot is wide enough to encompass several of the indicia on the tape at one time. In this way, slight irregularities in the spacing of the indicia will be averaged out and have little or no influence on the operation of the apparatus. The photocell is preferably positioned such that it receives diffuse light reflected from the tape rather than the most direct rays.

The output of the photocell is fed to a conventional amplifier 40, the output of which is applied to a small, synchronous motor 42 which is mounted so that its outer frame has a certain degree of freedom of rotational movement about the axis of its driveshaft. When the tape is being driven at normal speed, the amplifier will apply 60 cycle current to this motor.

A frequency control standard is provided in the form of a 110 v., 60 cycle power supply 44 which is applied to a synchronous motor 46, identical with the motor 42, which is driven by the amplified output of the photocell. The drive shafts of the two motors 42 and 46 are connected by a rigid coupling 48 and the frame of the motor 46 is mounted rigidly so that it cannot rotate.

The outer casing of the synchronous motor 42 is provided with a tapering extension 45 which is integrally joined to a shaft 47, provided with a pinion 49. The shaft 47 may be mounted in a bearing 50 so that the shaft will be firmly mounted and, at the same time, be free to rotate. The pinion 49, in turn, is in toothed engagement with a rack 52, rigidly connected to the flywheel drive motor 24, such that the rack is moved longitudinally to or fro axially of the drive shaft of the motor 24 as a consequence of any rotation of the pinion 49.

The two synchronous motors 42 and 46 cooperate to act as a mechanical differential. If the frequency of the signal received by the photocell 36 from the tape indicia and applied to the rotatably mounted, synchronous motor 42 is the same as that applied to the rigidly mounted, synchronous motor 46, no reaction will take place. But if the tape slips or has stretched, causing a momentary reduction to occur in the number of indicia per second passing through the scanning spot from the light source 34, a lower frequency will be fed to the rotatable motor 42. This would normally tend to slow down the rotation of the armature of this motor but this cannot take place since the drive shafts of the two motors 42 and 46 are rigidly connected. The compensating motion then is caused to take place in the field windings of the motor 42 and, since the casing moves with the windings, the casing will rotate a number of degrees depending upon the frequency change which has occurred. The rotation of the casing is transmitted to the pinion 49, which, in turn, moves the rack 52, causing the motor 24 and the drive pulley 26 to move radially inward with relation to the friction surface of the flywheel 22. This lowers the driving ratio, speeding up the flywheel, and increasing the speed of the tape such that the frequency of the signal produced by the indicia will again be the same as the standard frequency.

In an analogous manner, if the tape has momentarily speeded up or has contracted, causing more indicia per second to pass the scanning spot, the moving tape may be brought back into synchronism with the frequency being applied to the synchronous motor 46. In this case, the difference in frequencies applied to the motors 42 and 46 will cause the casing of the motor 42 to rotate in the opposite direction and the motion transmitted to the rack 52 by the pinion 49 will cause the attached motor 24 and the connected drive pulley 26 to move radially outward with relation to the flywheel 22, thus slowing it down by the resultant increase in driving ratio between the effective radii of the flywheel and driving pulley. The relative positions of the pinion and the rack may be changed, if necessary, in order to cause the desired direction of movement of the friction drive wheel 26 with a given type of variation in frequency, so that the desired speed adjustment is made.

A preferred modification of improved synchronous drive apparatus constructed according to the present invention is illustrated in Fig. 3. The actual tape which is being driven in synchronism with a control source is not shown in the illustration. It is assumed to be on the reverse side of the mounting panel 54 and it is being driven by a pulley attached to the shaft 56 which also serves as the supporting shaft for the flywheel 58. The scanning means and amplifier may be similar to that previously described in connection with Fig. 2.

The flywheel 58, which transmits its motion through the shaft 56 to the tape-driving pulley, is driven by a motor 60 having a drive shaft 62, to the end of which is attached a tapered driving pulley 64. The motion of the tapered pulley is transmitted to the flywheel by means of a belt 66 which may be an elastic band. If a cloth belt is used, a tensioning idler roller 68 is preferably used to maintain proper tension on the belt. With the motor 60 rotating at a substantially constant speed, the rotational velocity of the flywheel may, of course, be varied by moving the belt to various positions on the tapered pulley.

The belt may be automatically positioned on the tapered pulley by a means which, although differing in structure, accomplishes a result similar to that previously described for varying the speed of the tape-driving mechanism. A bracket 70 is mounted on the panel 54. The bracket has two outwardly extending arms 72 and 74. On the upper bracket arm 72 is rigidly mounted a synchronous motor 76 driven from a control source of 110 v., 60 cycle current which serves as a standard. The drive shaft 78 of the motor 76 is rigidly coupled to the drive shaft 80 of a second synchronous motor 82 which is the same as the motor 76. The second synchronous motor is mounted such that its casing is free to rotate through a predetermined angle about the axis of its drive shaft. This motor is fed from the output of the amplifier, such as 40 in Fig. 2, which amplifies the signal picked up from the recording tape.

The outer casing or frame of the motor 82 is integrally joined to a shaft 84 upon which is mounted a fork 86 having polished tines 88 and 90 extending adjacent to and on either side of the driving belt 66.

As in the modification first described, the motors 76 and 82, with their mountings and couplings, constitute a mechanical differential. If the frequency input to the motor 82 changes slightly from the standard frequency being applied to the motor 76, an adjustment will automatically be made by the outer frame of the motor 82 rotating slightly one way or the other. This will cause rotation of the fork 86 and either tine 88 or 90 will push against the driving belt 66, moving it to a different position on the tapered pulley 64; that is, toward either the end having the larger diameter or the end having the smaller diameter. This, in turn, changes the driving ratio between the tapered pulley and the flywheel 58, causing the flywheel, and consequently the recording tape, either to speed up or slow down, as the case may be. The direction of mounting of the fork 86 may obviously be changed such that there is obtained the type of speed change which is desired. In this manner, the frequency of passage of the indicia through the scanning spot is brought into synchronism with the standard control frequency.

In addition to utilizing the above described mechanisms to control the speed of a recording tape, they may also be used for synchronously driving other types of recording media, such as discs. This embodiment is illustrated in Fig. 4. In this embodiment, the driving motor 92 drives a friction surfaced disc 94 by means of a friction wheel 96. The friction surfaced disc is mounted on a turntable drive shaft 98, on the end of which is mounted a turntable 100 such as is commonly used in disc recording or reproducing. The under surface 100*a* of the turntable is provided with a ring of evenly spaced marks 102 which are scanned by a light beam from the lamp source 34. Reflected light from the marks is picked up by the photocell 36 and, just as described in connection with the embodiment of the apparatus illustrated in Fig. 2, the amplified signal output of the photocell and the output of a standard frequency source are applied to two synchronous motors which are connected so as to act as a mechanical differential. Any difference in frequency between the signal and the standard is translated into appropriate rotation of the pinion 49 which moves the rack 52 attached to the drive motor 92 and thus moves the friction drive wheel 96 in a radial direction with respect to the driven disc 94. This movement varies the drive ratio and the speed of the turntable is varied. Thus, any slippage occurring between the friction drive wheel and the friction surface of the disc 94 may be compensated for.

In some applications, it is desirable to maintain synchronism during starting and stopping as well as during operation at normal speed. For this type, the following substitutions may be made in the apparatus as previously described and illustrated. The variable speed drive motor may be replaced with a selsyn type motor. The rotatably mounted synchronous motor of the differential pair may also be replaced with a selsyn motor, as may the rigidly mounted synchronous motor, also. A D.-C. amplifier is used to amplify the signal received from the photocell instead of the A.-C. amplifier which is, of course, used with the modifications first described.

There has thus been described a method of and means for correcting the velocity of a recording tape such that the information which was recorded at a certain speed may be reproduced at the same, or some other desired, speed, even though the tape may have undergone dimensional changes in the interim or may have a tendency to slip on its driving pulleys. The systems of the present invention are most useful when used with friction drive mechanisms but are not limited thereto.

I claim as my invention:

1. In apparatus for synchronizing the velocity of a recording medium with a standard frequency source wherein the medium bears a series of regularly spaced signal producing marks, the signals produced from said marks being compared in frequency with signals from the standard source to produce a control for the velocity of said medium, a frequency comparing means comprising a first synchronous motor having a shaft and an outer casing, a second synchronous motor having a shaft and an outer casing, the shafts of said first and second motors being directly coupled together for simultaneous rotation, the outer casing of said first motor being fixedly mounted, the outer casing of said second motor being rotatably mounted, means for energizing one of said motors from the signals produced from said marks and means for energizing the other of said motors from the signals of said standard source, asynchronism of said signals resulting in a rotation of the outer casing of said second motor.

2. Apparatus for synchronizing the frequency of a signal produced by motion of a recording medium carrying a series of spaced visible marks with a standard frequency, said apparatus comprising means responsive to movement of said marks for producing a signal having a frequency proportional to the frequency of the passage of said marks, a standard frequency source variable speed drive means for driving said medium, and a differential drive mechanism responsive to said signal producing means and said standard frequency source, said differential drive mechanism including a rigidly mounted synchronous motor connected to said standard frequency source, a second synchronous motor connected to said signal producing means, said second motor being mounted such that its field is free to rotate through a limited angle, and means for rigidly connecting the drive shafts of said motors to each other, said variable speed drive means being responsive to rotational movement of said field for varying the velocity of said medium such that the frequency of said signals is synchronized with said standard source.

References Cited in the file of this patent

UNITED STATES PATENTS

| Number | Name | Date |
|---|---|---|
| 672,745 | Stonemetz | Apr. 23, 1901 |
| 1,446,246 | De Forest | Feb. 20, 1923 |
| 1,860,502 | Hansen | May 31, 1932 |
| 1,883,562 | Chipman et al. | Oct. 18, 1932 |
| 1,976,355 | Mees | Oct. 9, 1934 |
| 1,989,965 | Beverage | Feb. 5, 1935 |
| 2,052,263 | Whiteley | Aug. 25, 1936 |
| 2,080,575 | Perry | May 18, 1937 |
| 2,203,706 | Stockbarger | June 11, 1940 |
| 2,250,209 | Shoults et al. | July 22, 1941 |
| 2,321,647 | Brougham | June 15, 1943 |
| 2,367,975 | Sullivan | Jan. 23, 1945 |
| 2,443,756 | Williams et al. | June 22, 1948 |